Nov. 8, 1966 M. E. LASSER ETAL 3,284,241
PHOTO-EMISSIVE DEVICE INCLUDING EMITTER AND INSULATOR OF LESS THAN MEAN FREE PATH DIMENSIONS
Filed Feb. 13, 1962
FIG. 1.
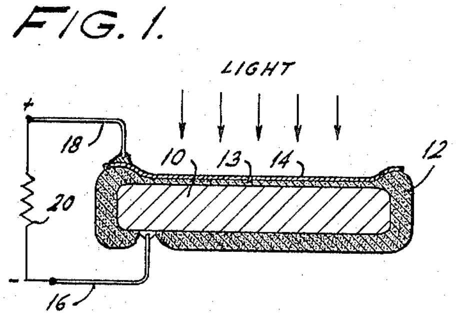
FIG. 2.
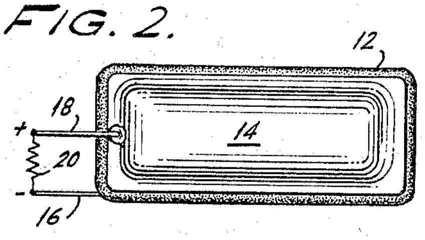
FIG. 4.
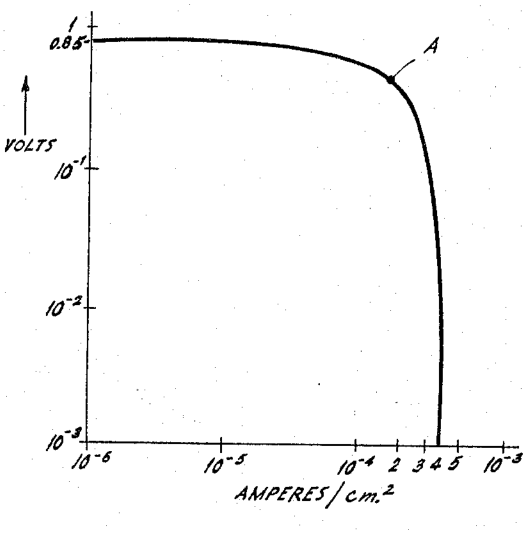
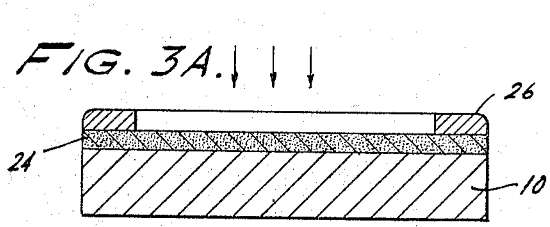
FIG. 3B.
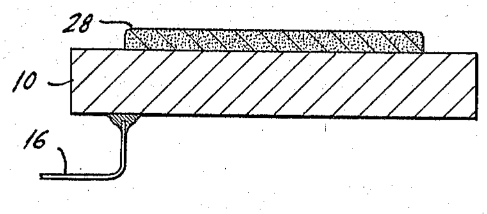
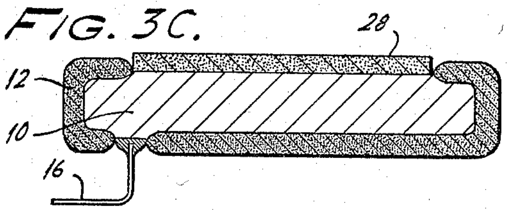
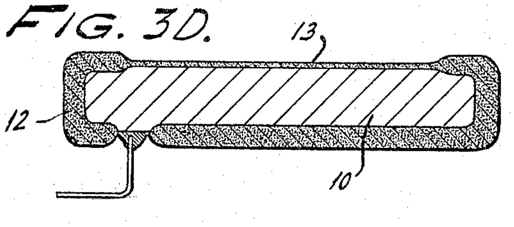
FIG. 5A.
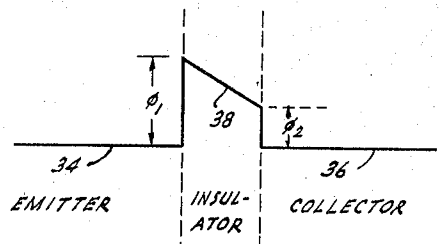
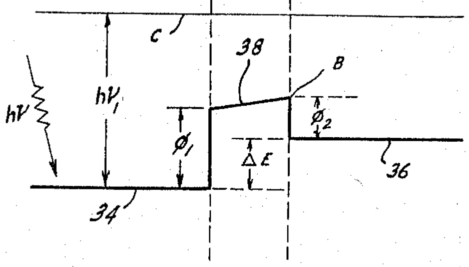
FIG. 5B.
INVENTORS
MARVIN E. LASSER
GERALD LUCOVSKY
BY
Albert L. Free
ATTORNEY United States Patent Office 3,284,241

Patented Nov. 8, 1966

3,284,241

PHOTO-EMISSIVE DEVICE INCLUDING EMITTER AND INSULATOR OF LESS THAN MEAN FREE PATH DIMENSIONS

Marvin E. Lasser, Elkins Park, and Gerald Lucovsky, Roslyn, Pa., assignors to Philco Corporation, Philadelphia, Pa., a corporation of Delaware Filed Feb. 13, 1962, Ser. No. 172,934
10 Claims. (Cl. 136—89)

This invention relates to photo-emissive devices for converting light energy, and particularly solar light energy, into electrical energy, and to methods for fabricating such devices.

Devices are known in the prior art which make use of photo-effects whereby the application of light to the device causes the generation between two electrodes thereon of a difference in potential which may be used to generate electrical power in a matched load element, to supply current to a load element, or to operate electrostatic apparatus. One class of such known devices is the silicon solar cell which employs a PN junction in silicon as the entity which, when illuminated with light of sufficiently short wave-lengths, delivers electrical power to a load connected between opposite sides of the junction. Such devices have been used successfully as sources of electric power for operating equipment in space vehicles for example. However provision of suitable PN junctions for this purpose is an expensive process, particularly where the device is to be extensive in area so as to intercept as much radiation as possible. In addition, since such devices rely upon semiconductive properties to provide the required PN junction they become inoperative when the temperature is raised above the relatively low values at which such properties exist, and since they are relatively thick they are easily damaged by nuclear radiations prevalent in space.

It has also been proposed to accomplish conversion of light energy to electrical energy by means of a photo-emissive device in which a composite-metal photo-cathode and an anode are spaced from each other in a vacuum. Light impingent upon the photo-cathode causes electrons to be ejected from the cathode into the vacuum, and some of these ejected electrons reach and enter the anode thereby producing a difference of potential between the photo-cathode and the anode which can be used as a source of electrical power for a load. However such devices are relatively inefficient in changing light energy to electrical energy, especially for light of the high intensities characteristic of solar radiation, because of fatigue of the cathode surface at high currents and because of the difficulty of locating broad areas of photo-cathode and anode sufficiently close to each other. In addition such a device is difficult and expensive to construct in a stable, efficient form, especially where the cathode and anode are to have very large areas, because of the requirements of providing a vacuum environment and a critical small spacing between electrodes.

Accordingly it is an object of our invention to provide a new and improved type of photo-responsive device.

Another object is to provide such a device which is capable of converting solar light energy into electrical energy.

A further object is to provide such a device which will operate at high temperatures.

Another object is to provide such a device which is highly resistant to the harmful effects of nuclear radiations.

Another object is to provide such a device which is more efficient than PN junction devices in converting very high-temperature black-body radiations to electrical power.

Still another object is to provide such a device which can be made simply and inexpensively, even when its light-intercepting area is made large.

It is a further object to provide a novel method for making a photo-responsive device.

In accordance with our invention the foregoing objects are achieved by providing a pair of layers of different conductive materials separated from each other by a layer of insulating material. A first one of the pair of conductive layers is an optically-exposed, photo-absorptive and photo-emissive film of a thickness smaller than the mean free path for electrons therein and serves as a photo-emitter. Where the photo-emitter is a metal it is ordinarily thin enough to be semitransparent. The other conductive layer has a work function which is low compared with that of said first layer, and serves as a collector of photo-electrons, and where the photo-emitter is metallic the collector layer is preferably substantially thicker than the photo-emitter layer. The insulating layer is a thin film having a thickness less than the mean free path for electrons therein but greater than the thickness for which appreciable breakdown current will flow therein in response to photo-electric voltages developed between said photo-emitter and said collector in response to illumination of said photo-emitter.

In one preferred embodiment of the invention the collector layer may be tantalum of a thickness greater than about 1000 Angstroms, the insulating layer may be a tantalum oxide film formed on the tantalum collector to a thickness of the order of 100 Angstroms, while the photo-emitter is copper and has a thickness of the order of 100 Angstroms.

In operation, light is directed against the photo-absorptive conductive film which serves as the photo-emitter to produce high-energy photo-electrons therein having sufficient energy to overcome the contact-potential-difference between the photo-emitter film and the insulating film and to be emitted into the insulating film. Because the mean free path for electrons in both the photo-emitter film and the insulating film is large compared with the thickness of these films, such high-energy photo-electrons pass through both films to the conductive layer which serves as the collector of photo-electrons, and make the collector negative with respect to the photo-emitter film. In the absence of an external current load between photo-emitter and collector, the collector quickly becomes so negative that further electrons cannot reach it from the photo-emitter. The voltage then existing between photo-emitter and collector is the open-circuit voltage of the device. A load element connected between photo-emitter and collector will be supplied with current from the device, the output voltage of the device then dropping below its open-circuit value until the rate at which current is withdrawn by the load equals the net rate at which charge is transferred from photo-emitter to collector.

Not thus far mentioned is a tendency for current also to flow in the device from collector to photo-emitter, in part due to undesired photo-emission from the collector and also due to electrical breakdown of the thin insulating film caused by the high electrical field-intensity produced therein by the photo-voltage generated between photo-emitter and collector. However since the internal surface of the collector is shielded from light except for any residual light which may reach it through the photo-emitter and insulating film, and since the collector may be made sufficiently thick that it reflects most of any such residual light instead of absorbing it, photo-emission from the collector is small compared with that from the photo-emitter. Furthermore, the thickness of the insulating film is great enough, and preferably just great enough, that any breakdown current through it, such as may be caused by quantum-mechanical tunnelling of electrons or avalanche-breakdown in response to the generated photo-voltage, is small compared with the photo-current flowing from photo-emitter to collector. Where a substantial load current is to be drawn from the device so that the output voltage is reduced, the insulating layer may be made thinner than when smaller load currents are drawn without producing an intolerable breakdown current within the device because of the reduced field-intensity in the insulating layer.

The use of a collector material having a work function small compared with that of the emitter material increases the maximum voltage and the current which the device can generate, for reasons explained hereinafter.

Other objects and features of the invention will be more fully appreciated from a consideration of the following detailed description taken in connection with the accompanying drawings, in which:

FIGURE 1 is a partly diagramatic and partly sectional representation, not to scale, of one preferred form of a device and circuit for using it, in accordance with the invention;

FIGURE 2 is a plan view of the device shown in section in FIGURE 1;

FIGURES 3A, 3B, 3C and 3D are sectional views of a device in successive stages of fabrication in accordance with the invention;

FIGURE 4 is a graphical representation showing the current-voltage output characteristic of one form of device in accordance with the invention; and FIGURES 5A and 5B are electron-energy diagrams to which reference will be made in explaining the principle of the invention.

Considering now by way of example only the specific form of device shown in FIGURES 1 and 2, which are not to scale and in which corresponding parts are indicated by corresponding numerals, our device in this example comprises a sheet of pure tantalum 10, in this case rectangular in form, having thereon a surface oxide layer 12 which has a portion 13 of small, uniform thickness over the top surface of the tantalum sheet and is thicker on other portions thereof, a thin layer 14 of copper extending over and beyond the portion 13 of the top surface of the oxide which is of small, uniform thickness, a connecting wire 16 fastened to the underside of the tantalum sheet, and another connecting wire 18 electrically connected to the copper layer 14, as by silver paste, on a part of the copper layer 14 which overlies the thicker portion of the oxide layer 12.

The tantalum sheet 10 is typically relatively thick, e.g. about 5 mils, so that it reflects, rather than absorbs, any light incident thereon. The copper layer 14, on the other hand, is semi-transparent, typically having a thickness of about 100 agnstroms, so that it absorbs the maximum amount possible of the light traversing it—e.g. about 30 percent thereof. The thickness of the tantalum oxide layer 12 is preferably about 100 angstroms over the thin portion 13 thereof between the copper layer 14 and the tantalum sheet 10, which is the active, light-responsive portion of the device. However at the edge of the copper layer 14 the oxide is thicker, e.g. 3000 angstroms thick, so as to permit more convenient application of the lead 18 without danger of shorting through to the underlying tantalum sheet.

In use, the thin copper film 14 is exposed to radiant energy such as that from the sun, which produces a difference in potential, or photo-voltage, between the lead 18 and the lead 16. Any suitable load element, represented by resistor 20, connected between leads 16 and 18 will then be supplied with voltage and current generated by the device in response to the incident radiation. For maximum power transfer to the load element the impedance of the load element equals the impedance of the photo-device between leads 16 and 18.

While the principle of operation of the device as well as the factors to be considered in constructing a device for a particular application will be considered in further detail hereinafter, in general the operation of the device is as follows. Light incident upon the thin copper film 14 in part passes through film 14 and in part is absorbed thereby, the portion which is absorbed producing high-energy photo-electrons in film 14 having sufficient energy to be emitted into the thin insulating film 13 and to pass to the tantalum sheet 10, where they are collected. Those electrons which thus reach tantalum sheet 10 cause said sheet and the lead 16 to become negative to lead 18 and therefore produce the difference in voltage required to pass current through load 20. With sufficient illumination, open-circuit output voltages between leads 16 and 18 of about 0.8 volt or more can thereby be achieved, and when the impedance of the load is adjusted for maximum power transfer the power generated in the load may be as high as one-half milliwatt per square centimeter of the exposed active area of copper film 14 covering the thin region 13 of oxide layer 12. Power conversion efficiencies obtainable in this form of our device are from 0.1% upward toward 1%.

One preferred method for fabricating a device of the type shown in FIGURES 1 and 2 is as follows.

Referring to FIGURES 3A, 3B, 3C and 3D, in which parts corresponding to those of FIGURES 1 and 2 are indicated by corresponding numerals, and in which the various parts again are not to scale, a rectangular sheet 10 of pure tantalum is first cleaned and prepared by immersing it for a few seconds in an etchant consisting of 3 parts by volume of nitric acid, 2 parts by volume of hydrofluoric acid, and 5 parts by volume of sulphuric acid, after which it is immersed in boiling water and then anodized in a solution of 3 parts by weight of ethylene glycol, 1 part by weight of oxalic acid 2 parts by weight of water, to a voltage of about 50 volts. The resultant tantalum oxide formed on the tantalum is then removed by completely immersing the sheet in hydrofluoric acid, which removal generally requires a few minutes of immersion. The sample is then washed again in boiling water to remove any residual fluorides.

As shown in FIGURE 3A the tantalum sheet 10 is then covered on its upper surface with a conventional photo-lithographic resist 24 of the well known type which, before exposure to ultra-violet light, is readily soluble in an appropriate developer solution but after exposure to ultra-violet light is substatially insoluble in the same developer solution. A suitable metal mask 26, in this case comprising a piece of metal having a rectangular aperture in the center thereof, is placed on top of the layer of resist to define a central rectangular region having substantially the same outline as that of the active area of the completed device. This assembly is then exposed to ultra-violet light for a time sufficient to render insoluble the portion of the resist lying within the aperture defined by mask 26.

The mask 26 is then removed and the assembly washed in a developer solution to dissolve the unexposed resist, leaving the exposed rectangle 28 of resist on the upper surface of the tantalum as shown in FIGURE 3B. At this time a suitable electrical lead 16 may be soldered or otherwise connected to the underside of the tantalum sheet by conventional means. Next the tantalum sheet with the rectangular resist 28 thereon is anodized by placing it in the above-mentioned solution of ethylene glycol and oxalic acid and making the lead 16 positive with respect to an inert cathode in the solution. The anode current is typically adjusted to provide a current density of the order of 0.002 ampere per square centimeter at the surface of the tantalum. As shown in FIGURE 3C, this anodizing causes the growth of the tantalum oxide layer 12 on the exposed portion of the tantalum sheet, and is continued until the anodizing voltage increases to about 150 volts corresponding to production of a layer of oxide about 3000 angstroms thick over all of the tantalum except that covered by the resist and the soldered connection for lead 16.

Next the resist is washed off in a conventional stripping solution and the assembly again inserted in the anodizing solution to grow an oxide film 13 about 110 angstroms in thickness over the region of the tantalum previously covered by the resist, as shown in FIGURE 3D. This thickness of oxide is produced by electrical forming in the anodizing solution to a voltage of about 6 to 6.5 volts, each additional volt adding about 18 angstroms to the thickness. Following this the assembly is dried and placed in a vacuum evaporation chamber operating at a pressure about $10^{-5}$ millimeters of mercury to deposit the copper layer 14 of FIGURES 1 and 2 over the thin oxide region 13 and over a portion of the adjacent thicker oxide. Conventional arrangements of masks and shutters may be used to control the location of the plating and its thickness. The electrical lead 18 may then be connected to the copper layer 14 by applying conventional silver paste to the lead and to the portion of the copper layer which overlies the thicker portion of layer 12 beyond the periphery of the thin oxide film 13.

The current-voltage output characteristics of the device of FIGURES 1 and 2 may be obtained by illuminating the sensitive upper surface 13 of the device with light from a standard source, such as a mercury lamp containing a strong ultra-violet component plus strong lines in the yellow and green portions of the spectrum, and measuring the voltage between, and the current through, the leads 16 and 18 as the impedance of the load 20 is varied from a short-circuit, or zero-resistance, value to a high resistance corresponding to open-circuit operation.

Such a characteristic is shown in FIGURE 4 for the case in which the illumination focussed upon the upper sensitive surface of the device is from a mercury lamp and is at least several times stronger than solar intensity. In the latter graph, ordinates represent voltage between leads 16 and 18 to a logarithmic scale while abscissae represent current density in amperes through load element 20 per square centimeter of the active areas of the device, also to a logarithmic scale. As shown by the graph, for very small output currents corresponding to the open-circuit condition the output voltage is about 0.85 volt, and the output voltage does not fall off appreciably until the output current is greater than $10^{-4}$ amperes/cm.². When the output terminals of the device are substantially short-circuited so that the output voltage is zero, the maximum current of about $4\times10^{-4}$ amperes/cm.² is produced. When the device is to be used as a solar power converter the impedance of the load element is adjusted to produce in the load element a maximum of power, which is the product of output voltage and output current. This maximum occurs at the operating point A of FIGURE 4, for which the output power is about 0.1 milliwatt per square centimeter of active area. For a device of the type described hereinbefore in detail in which the active area, i.e. the area of the thin portion 13 of the tantalum oxide layer, is about 10 square centimeters, the load element 20 may have a resistance of about 100 ohms to provide a maximum power to the load of about one milliwatt.

The significance of the various materials and dimensions used in our device will be more fully appreciated from the following discussion of the theory of operation thereof, with particular reference to FIGURES 5A and 5B. In both FIGURES 5A and 5B ordinates represent electron energies at various positions along a straight line extending through a device such as that of FIGURES 1 and 2 and normal to the emitter, insulator and collector layers. Lines 34 and 36 of FIGURES 5A and 5B represent the Fermi levels in the emitter and collector materials respectively, $\phi_1$ and $\phi_2$ are respectively the emitter and collector barrier heights produced by contact potentials at the emitter insulator interface and collector-insulator interface, and line 38 is the bottom of the conduction band in the insulator.

FIGURE 5A represents the electron-energy relationship existing when no illumination is applied to the device. In this case the emitter and collector Fermi levels 34 and 36 are at the same energy level, and no potential difference exists between emitter and collector. However if light having a frequency $\nu_1$, for which the product of Planck's constant $h$ times the light-wave frequency $\nu$ exceeds the barrier height $\phi_1$, is applied to the emitter near the emitter barrier, some electrons near the emitter barrier will receive an increment of energy equal to $h\nu_1$ and will pass the emitter barrier, traverse the insulator layer and reach the collector. Each such electron raises the Fermi level 36 of the collector, producing a photo-voltage between emitter and collector. Light components for which the product $h\nu$ is less than $\phi_1$ will be ineffective to produce such electron transfer and will not contribute to the output photo-voltage.

FIGURE 5B represents the electron-energy levels existing when light containing frequency components as high as $h\nu_1$ has been applied to the emitter for a time sufficient to produce an equilibrium condition therein. Here the number of excess transferred electrons in the collector has reached an equilibrium value producing an output-photo-voltage corresponding to the difference in Fermi levels $\Delta E$. This equilibrium condition occurs when the desired forward photo-current flowing from emitter to collector inside the device is exactly balanced by the total backward current flowing from collector to emitter both inside the device and by way of any external load connected between emitter and collector. In the absence of all such backward currents the output photo-voltage would rise until the top B of the collector barrier was at an energy level C located above the Fermi level in the emitter by an amount $h\nu_1$, since for lesser output voltages, and only for lesser output voltages, photo-electrons of excess energy $h\nu_1$ would have energies great enough to continue to pass both the emitter and collector barriers and to add to the output voltage. However, even when no external load current is drawn from the device the internal backward current of the device flowing from collector to emitter will cause the net forward current to become zero at an output voltage less than that for which point B is at the level C.

This backward component of current has two principal sources. One is photo-emission from the collector material into the insulator and thence to the emitter. Such photo-emission may be caused by light reaching the collector material in the vicinity of the collector barrier, for example by way of the thin emitter and insulator layers. The other is a backward leakage current caused by electrical breakdown of the insulating layer in response to the high field intensities produced in the insulating layer by the photo-voltage generated between emitter and collector. For example, if a voltage of one bolt were produced across an insulating film 10 angstroms in thickness then a field intensity of $10^7$ volts per centimeter would be produced in the insulating film in the direction to drive electrons through the insulating film in the back direction from collector to emitter. With such high field intensities and small thicknesses the insulating layer would break down and pass a very large current in the back direction, by one or both of the phenomena of electron-avalanching and quantum-mechanical tunneling of electrons through the insulator. Under these conditions the forward current produced by light would be insufficient to maintain the output voltage of one volt, and the output voltage instead would stabilize at a much lower value for which the sum of the reverse breakdown current and the backward photo-current equals the forward photo-current. For thicker insulator films the reverse breakdown current is less for a given photo-voltage, but for the ranges of thickness less than a mean free path employed in our device this current generally remains a significant factor in limiting the output voltage obtainable.

The magnitude of the impedance of the external load connected between collector and emitter also affects the output voltage produced by our device, as described hereinbefore with respect to FIGURE 4. Current flow through the external load element affects the output voltage in substantially the same manner as does back-current flow inside the device, since it also acts to prevent accumulation of additional charge on the collector. Accordingly the output voltage stabilizes at a value for which the forward photo-current is equalled by the sum of the internal and external currents flowing from collector to emitter.

Also important is the amount of output current which the device can produce in the load current, since the power delivered to the load element is the product of output voltage and output current. For a given device this current varies from zero to a maximum, or short-circuited, value with changes in load impedance, according to the general relationship shown in FIGURE 4. The short-circuit current value, like the open-circuit voltage, is characteristic of the device, and equals the forward photo-current minus the backward internal current. To deliver maximum power to the load element, which is the objective when the device is used for its primary purpose of converting light energy to electrical power, both the open-circuit output voltage and the short-circuit current should be as great as possible, and the load element should be matched to the impedance of the photo-device between emitter and collector.

FIGURES 5A and 5B also illustrate the effect of using a low work-function material for the collector. This low work-function produces a small value of collector barrier height $\phi_2$, with the following advantages. The energy $\phi_2$ corresponds to energy lost by electrons reaching the collector as they fall in energy from the level B to the Fermi level in the collector. $\phi_2$ therefore represents excess electron energy imparted to the electrons in the emitter but which does not contribute to raising the Fermi level of the collector and hence does not contribute to the output voltage. By making $\phi_2$ small the output voltage is increased or the light frequency required to produce a given output voltage reduced. In addition, when $\phi_2$ is small compared with $\phi_1$ the upward slope from left to right of the bottom 38 of the conduction band of the insulator is reduced or eliminated for a given output voltage. The upward slope of the line 38 is proportional to the retarding electric field encountered by the photo-electrons travelling from emitter to collector, and making this slope small or even negative facilitates this flow, while a high positive slope retards the desired electron flow. The excess of $\phi_1$ over $\phi_2$ which is desired to enhance electron flow is produced by using emitter and collector materials having respective work-functions $W_1$ and $W_2$ such that $W_2$ is less than $W_1$ by the amount $\phi_1-\phi_2$.

Considering now the characteristics required or preferred for the various elements of our device in order to produce the above-described operation, the emitter should be such as to absorb the greatest possible amount of light energy and to convert it into excess energy of electrons in a portion of the emitter from which the electrons can reach the emitter barrier with sufficient energy to surmount it. It has been found that for a metal to absorb light appreciably by conversion of phontons to excess electron-energy the metal must be thinner than about 1000 angstroms or else nearly all of the incident light will be reflected rather than absorbed; it must also be thicker than about 10 angstroms or else nearly all of the incident light will be transmitted through the film without absorption. The preferred range of thickness for greatest absorption is about 50 to 300 angstroms, and the optimum for most metals is around 100 angstroms. In order for the absorbed light to be used efficiently in producing electrons which will not lose too much of their excess energy before reaching the adjacent insulator film, absorption should occur within about one mean-free-path length from the metal-insulator interface. Since the mean free path of electrons in metals is of the order of 300 angstroms, depending somewhat upon the particular metal, an emitter layer having a thickness of from about 50 to about 300 angstroms not only absorbs light effectively but also provides absorption within a mean free path from the metal-insulator interface, as desired. The smaller the thickness of the emitter metal compared with a mean free path the less energy is lost by collisions, and accordingly the emitter thickness of about 100 angstroms preferred for best light absorption is also excellent for preventing electron-energy loss in reaching the metal-insulator interface.

As to the material used for the emitter, it is a feature of the invention that any of a large variety of conductive materials may be used for this purpose so long as it is sufficiently stable in the device and forms at the emitter-insulator interface a barrier having a height $\phi_1$ suited to the particular application—i.e. lower than the value of $h\nu$ for the light to be detected, and greater than the barrier height $\phi_2$ at the insulator-collector interface. Since ordinary elemental metals such as copper, gold and nickel may be used, fatigue of the emitter material, which in alkali-metal vacuum-tube photo-cathodes reduces photo-emission after large current densities have been passed, does not occur in our device. Because of the wide range of emitter materials which may be used the emitter material may also be chosen for convenience in fabrication, for stability against change with temperature or time, or to produce a particular desired barrier height at its interface with a given insulator.

Alloys of metals may also be used for the emitter, as well as layers of different conductors. For example a laminated emitter construction may be used in which a first thin lamina of a metal such as aluminum chosen for its contribution to stability of the device is formed against the surface of the insulator and a second thin lamina of a metal such as gold or copper chosen for its excellent photo-emissive characteristics is formed on top of the first lamina, the combined thicknesses of the two laminae being smaller than a mean free path for electrons therein; photo-emissive semiconductors such as germanium or cadmium sulfide may also be used as the exterior photo-emissive portion of the laminate structure in place of the copper or gold lamina mentioned. The latter type of laminate structure is particularly advantageous because a first material which is highly photo-responsive may not be as satisfactory as another material from the viewpoint of producing a stable device with low leakage conduction from collector to emitter, and the laminate structure using the first material as the exterior photo-responsive lamina and using the other material in contact with the insulator provides the advantages of both materials without their disadvantages.

Alternatively, the entire emitter may be a semiconductor, for example cadmium sulfide. To provide such a device the same steps described above in connection with FIGURES 3A, 3B, 3C and 3D may be used, but instead of applying a metal emitter film as the next step the emitter film is formed by chemically plating cadmium sulfide onto the tantalum oxide. Such plating about 1000 angstroms thick may be provided by immersing the tantalum-tantalum oxide assembly for about one hour at 55° C. in a constantly-stirred solution comprising 100 milliliters of a saturated solution of $Cd(OH)_2$ and $NH_4OH$ plus 15–20 milliliters of $\frac{1}{20}$ normal thiourea. When the conductive emitter material is a semiconductor the thickness producing best light absorption and the mean free path for electrons therein are about ten times greater than for a metal, and hence the thickness of a semiconductor used as emitter is preferably about ten times that appropriate for a metallic emitter. A semiconductor used as emitter has the advantage of higher maximum efficiency in converting light to electrical power because greater absorption in the semiconductor produces more photo-electrons and the band structure of the semiconductor causes a greater percentage of the photo-electrons to have energies great enough to surmount the emitter barrier.

As mentioned previously, the emitter material should also be chosen to provide a barrier height at the emitter-insulator interface which will enable the device to respond to light of the desired frequencies, the emitter barrier height $\phi_1$ being made less than the value of $h\nu$ for the lowest frequency to be detected. For the specific device described with reference to FIGURES 1 and 2 using copper and tantalum oxide as emitter and insulator respectively, the barrier height $\phi_1$ is about two e.v., and light having frequencies above about 6000 angstroms is detected. In addition the emitter barrier height is preferably chosen so that it is substantially larger than the collector barrier height $\phi_2$, so that the retarding electric field in the insulator is reduced or eliminated.

The collector layer should be sufficiently thick to reduce its sheet resistance and permit easy external connection thereto, and where the emitter is ordinary metal use of a thick collector reduces absorption of light thereby to a small fraction of the light incident thereon. As mentioned above, for most metals this condition is obtained when the thickness of the collector layer is greater than about 1000 angstroms.

The material of the collector layer is also subject to wide variation depending upon the requirements of the particular device and convenience of application. The primary requirement is that it provide the desired collector barrier height $\phi_2$, which should be as small as possible and in any event smaller than the emitter barrier height $\phi_1$ for the reasons stated hereinbefore. In general, the difference in barrier height $\phi_1-\phi_2$ is approximately equal to the difference between the work-functions of the emitter and collector materials in contact with the insulating layer, and hence the collector material adjacent the insulator is preferably a material having a work-function smaller than that of the emitter material. For example copper, gold and nickel having work-functions of about 4.5, 4.8 and 5.0 respectively are excellent as emitter materials, while materials such as tantalum, aluminum and beryllium having work-functions of about 4.2, 4.1 and 3.8 respectively are excellent collector materials from this viewpoint.

As to the insulating layer, the thickness of this is determined by the joint objectives of making it sufficiently thin that electron-energy loss in transport through it is minimized and sufficiently thick that reverse-breakdown current through it is minimized. It should also be sufficiently thin to prevent space-charge limiting of the current flow for the current densities obtainable. Electron-transport without appreciable energy loss is provided by making the insulating layer thin compared with the mean free path for electrons therein. Since the mean free path for insulators is of the order of 100 to 1000 angstroms, an insulator thickness which is of the order of 100 angstroms is satisfactory for most insulators including tantalum oxide. With respect to reverse-breakdown current, an insulator thickness of the order of 70 to 100 angstroms is great enough to provide an effective reverse-resistance through the insulator of greater than $10^6$ ohms for one square centimeter with one volt of photo-voltage, which is high enough to produce a negligible loss in conversion efficiency of the device.

As to space-charge limitation of current flow, the thickness of the order of 100 angstroms required in the insulator for efficient forward transport of electrons is sufficiently small that space-charge limiting cannot occur in a substantially trap-free material unless the current density is on the order of $2.5 \times 10^6$ amperes per square centimeter, which is many orders of magnitude above the maximum current which can be generated by the solar light flux, and hence with ordinary insulators having low trap densities space-charge is not a limiting factor in our device.

It will be understood that while the specific method of fabrication described hereinbefore in detail has been found satisfactory, other forms of fabrication procedures may be employed instead. In the particular process described hereinbefore, anodic oxidation of the collector material followed by evaporation of the emitter film is employed. Other typical fabrication procedures may employ exposure to oxygen or air to form the oxide, and sputtering or other particle deposition procedure to form the thin emitter film. One may also form any of the three layers by evaporation, by vapor-plating involving deposition of a portion of a decomposed compound, or by reacting substances other than oxygen with one of the layers to form another layer. Other suitable processes will occur to one skilled in the art. In any case it is not necessary to form a P–N junction or to provide electrodes closely-spaced in a vacuum, and hence the device may be fabricated easily, inexpensively and with very large active areas. In particular, since the device can be made by an all-evaporative process the substrate and all other layers can be very thin, giving a device which is very light and highly resistant to damage by nuclear radiations.

While the invention has been described with particular reference to specific examples thereof it will be understood that it may be embodied in forms differing widely from those specifically described without departing from the scope of the invention as defined by the appended claims.

We claim:

1. A photovoltaic device for converting incident light to electrical energy, comprising, in combination:

a first photoabsorptive, photoemissive, and electrically continuous conductive layer comprising a film of metal having a thickness of about 50 to 300 angstorms and less than the mean free path for electrons in said metal, whereby incident light will generate free electrons in said film yet said film will be thick enough to be mechanically stable and electrically continuous, one surface of said layer being exposed so that light can be received substantially directly thereon, a layer of insulating material adjacent said first layer, said insulating layer having a thickness of about 70 to 100 angstroms and less than the mean free path for electrons in said insulating material, whereby said insulating layer will have an effective reverse resistance of greater than $10^6$ ohms per square centimeter for an applied potential difference thereacross of one volt, and whereby free electrons generated in said first layer will be able to pass through said insulating layer, a conductive collector layer of a material different from the metal film of said first layer and adjacent the other side of said insulating layer, said collector layer having a thickness of about 1000 angstroms or greater, whereby said collector layer will reflect rather than absorb most of the residual light reaching it through said first and said insulating layers, and means for providing respective electrical connections to said collector layer and said first layer to which a load impedance may be connected, said first conductive layer and said collector layer being insulated from each other.

2. A device in accordance with claim 1 in which the material in said second conductive layer has a lower work function than the metal film of said first layer.

3. A device in accordance with claim 1, in which the thickness of said first photoabsorptive layer is about 100 angstroms and the thickness of said insulating layer is about 100 angstroms.

4. A device in accordance with claim 1, in which said collector layer is of tantalum and said insulating layer is of tantalum oxide.

5. A device in accordance with claim 4, in which said insulating layer is an anodically-formed oxide grown on said tantalum.

6. A device in accordance with claim 4, in which said first photoabsorptive layer is selected from the group consisting of copper and gold.

7. A device in accordance with claim 6, in which said first photoabsorptive layer is comprised of adjacent overlying laminae of different conductive substances.

8. A photovoltaic device for converting incident light to electrical energy, comprising, in combination:

a first photoabsorptive layer of semiconductive material having a thickness of about 500 to 3000 angstroms and less than the mean free path for electrons in said material, whereby incident light will generate free electrons in said layer, one surface of said layer being exposed so that light can be received substantially directly thereon, a layer of insulating material adjacent said first layer, said insulating layer having a thickness of about 70 to 100 angstroms and less than the mean free path for electrons in said insulating material, whereby said insulating layer will have an effective reverse resistance of greater than $10^6$ ohms per square centimeter for an applied potential difference thereacross of one volt, and whereby free electrons generated in said first layer will be able to pass through said insulating layer, a conductive collector layer of a material different from the material of said first layer and adjacent the other side of said insulating layer, said collector layer having a thickness of about 1000 angstroms or greater, whereby said collector layer will reflect rather than absorb most of the residual light reaching it through said first and said insulating layers, and means for providing respective electrical connections to said collector layer and said first layer to which a load impedance may be connected for absorbing power from said photovoltaic device, said first photoabsorptive layer and said collector layer being insulated from each other.

9. A device in accordance with claim 8, in which said semiconductor is cadmium sulfide about 1000 angstroms in thickness.

10. A photovoltaic cell, comprising, in combination:

a first layer of a metal selected from the group consisting of copper and gold and of the order of 100 angstroms in thickness whereby incident light will be able to generate free electrons in said layer yet said layer will be thick enough to be mechanically stable and electrically continuous, one surface of said layer being exposed so that light can be received substantially directly thereon, an insulating layer of tantalum oxide adjacent said first layer and having a thickness of about 100 angstroms, a layer of tantalum having a thickness greater than 1000 angstroms adjacent the other side of said insulating layer, whereby light incident on said first layer will generate free electrons having energy sufficient to pass through said insulating layer to said layer of tantalum, the thickness of said tantalum layer being great enough to reflect, rather than absorb, most of the residual light reaching it through said first and said insulating layers, and a pair of electrical connections on said first metal layer and said tantalum layer, respectively, to which a load impedance may be connected for absorbing electrical energy generated by said photovoltaic device, said first layer being electrically insulated from said tantalum layer.

References Cited by the Examiner

UNITED STATES PATENTS

| | | | |
|---|---|---|---|
| 1,995,200 | 3/1935 | Cubbitt et al. | 136—89 |
| 2,105,303 | 1/1938 | Van Geel | 136—89.01 |
| 2,221,596 | 11/1940 | Lorenz | 136—89.11 |
| 2,677,714 | 5/1954 | Auwater | 136—89.01 |
| 2,985,783 | 5/1961 | Garbuny et al. | 186—89 X |
| 2,993,266 | 7/1961 | Berry. | |
| 3,049,622 | 8/1962 | Ahlstrom et al. | 136—89 |

FOREIGN PATENTS 403,763 1/1934 Great Britain.

OTHER REFERENCES

Engle, J. M. High Thermal Conductive Substrate, IBM Technical Disclosure Bulletin, vol. 4, No. 8, January 1962.

International General Electric Co. et al. (2 pp. spec.).

Modern Physics for the Engineer, pgs. 400–401, pub. 1954 by McGraw-Hill Book Co.

H. J. Reich Theory and Application of Electron Tubes, 1944, chapt. 13, pp. 557, 558.

WINSTON A. DOUGLAS, *Primary Examiner.*

JOHN R. SPECK, D. L. WALTON, A. B. CURTIS, *Assistant Examiners.*